May 24, 1927. 1,630,036
L. R. SMITH
FLEXIBLE AUTOMOBILE FRAME AND TUBULAR CROSSBAR THEREFOR
Filed May 11, 1923
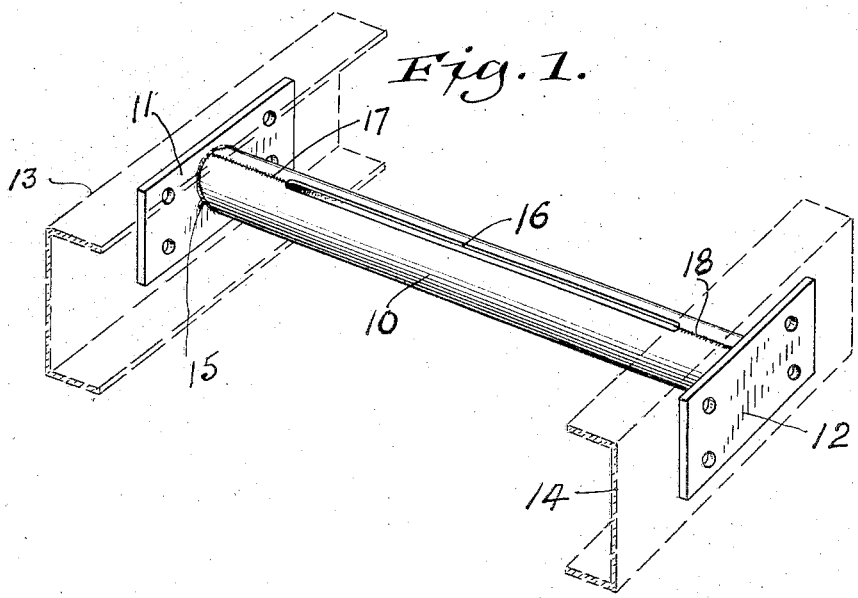
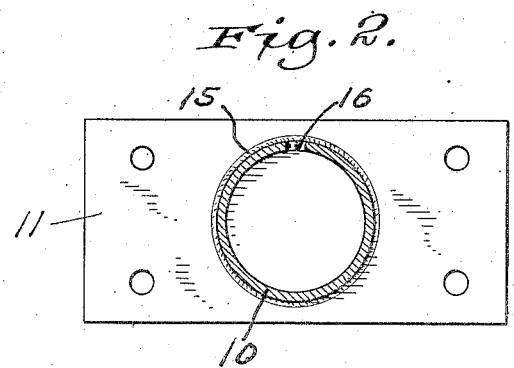
INVENTOR.
L. R. Smith,
BY
Erwin, Wheeler & Woolard
ATTORNEYS.
WITNESS
Fred Palm
DEL.

Patented May 24, 1927.

1,630,036

UNITED STATES PATENT OFFICE.

LLOYD RAYMOND SMITH, OF MILWAUKEE, WISCONSIN, ASSIGNOR TO A. O. SMITH CORPORATION, OF MILWAUKEE, WISCONSIN, A CORPORATION OF NEW YORK.

FLEXIBLE AUTOMOBILE FRAME AND TUBULAR CROSSBAR THEREFOR.

Application filed May 11, 1923. Serial No. 638,415.

The invention relates to motor vehicle frames in the construction of which channel side bars are employed, the latter being pressed from steel plates, and which are permanently connected by means of a plurality of cross bars so as to constitute a unitary and practically rigid structure. In such frames it is highly desirable that rigidity of structure, consistent with lightness in weight, be attained.

After extensive experimentation, it has been found that the results desired can be secured by using tubular cross bars of peculiar type in a construction embodying channel side bars of the form referred to. Such tubular cross bars act as torsion resisting members, and serve to resist the twisting strains to which the frame is ordinarily subjected when unfavorable road conditions are encountered. But it has been found that absolute rigidity in an automobile frame is not necessary, and my present invention has for its purpose the construction of a light weight frame, which, although flexible, is one in which the maximum necessary degree of rigidity is preserved, and yet which will allow for slight yielding of the frame, so as to permit a slight variation or weaving from its original fixed plane without injury, in case unusual strains are encountered in the operation of the vehicle.

I achieve these results by employing a tube to the ends of which are secured plates for attachment to the side bars of the frame, such plates being secured to the ends of the tube preferably by welding in the manner disclosed in the application of B. T. Andren, Serial No. 537,883, filed February 20, 1922, in which the line of union between the said attaching plates and the tubular cross bar is equal to the circumference of the tubular member, so as to constitute a line of shearing strain possessing a maximum degree of resistance. However, instead of using a tube which is seamless from end to end, as is proposed in the said application, I employ a tube with an open or unwelded seam at its central portion or mid-length, and closed or welded for a distance extending inwardly from each of its ends. The open seam intermediate the length of the cross bar may be produced by slitting a drawn or welded seamless tube, or, preferably, by drawing such tube from a flat strip and welding the abutting edges for an appropriate distance extending longitudinally from its ends, and so leaving an unwelded portion of any desired extent.

In practice, a tubular torsion resisting member thus constructed possesses capacity for slightly yielding or twisting under the torsional strains arising when the vehicle in which the frame is incorporated encounters unusual road conditions. Therefore, a frame having such cross bars will be capable of partaking in a slight twisting movement, within the elastic limits of the metal forming the tube, without the least injury to the frame or its connections, or the adjunctive parts and devices associated therewith.

The improved construction has been demonstrated to be highly efficient in that a better distribution of the strains to which the frame is subjected under adverse operating conditions is secured.

The novel features of the invention will be pointed out in the appended claims.

In the accompanying drawing:

Figure 1 is a perspective view of a complete and unitary cross bar constructed in accordance with my invention, and showing by dotted lines portions of the side bars of an automobile frame of which it forms a part.

Fig. 2 is a transverse sectional view through the center of a cross bar, showing in a somewhat exaggerated degree the separation or unwelded arrangement of the edges of the tubular torsion resisting cross bar.

Referring to the drawing, the numeral 10 designates a tubular cross bar, connected at its ends so as to form an integral structure with plates or flanges 11 and 12, the latter being designed to be seated in the channels of the side bars 13 and 14, and permanently and rigidly secured thereto by any appropriate means.

Preferably, the respective abutting ends of the tubular cross bar are welded to the contiguous attaching plates on circumferential lines, as at 15, by the complete fusion of the metals into an integral structure, so that the line of shearing strain at the point of union between the parts is equal in length to the circumference of the cross bar. By means of such welding, a complete union between the parts is effected in the highest possible degree, and the cross bar and its attaching plates are converted into an integral structure of cross bar, designed and well adapted to oppose by resistance any of the stresses to which it may be subjected.

The tubular part of the cross bar may be formed from a drawn or welded seamless tube, which is provided intermediate its ends with a longitudinally extending separation, as 16. The separation may be produced by slitting the seamless tube for a portion of its length intermediate its ends, so as to leave unbroken portions 17 and 18 extending inwardly from the ends of tube to the slit. Or, the tube can be formed by being drawn into tubular shape from a strip of metal, and welded only at certain points in the line of its meeting edges, so as to produce the integral and unbroken portions 17 and 18, with the intermediate separation constituted by the unwelded meeting edges of the tube. The method of production last described is preferable by reason of its greater economy, although the results achieved are the same in either case. In the drawing, the longitudinal opening 16, constituted by the slit in the tube, or its unwelded meeting edges, is shown as exaggerated for the sake of clearance. But in practice, the slit will have only the width of the tool used in cutting it, and the line of separation demarking the unwelded opening in the tube formed from a strip will be barely perceptible, by reason of the close and abutting contact of the meeting edges of the strip.

A vehicle frame in the construction of which tubular cross bars of the construction described are employed as torsion resisting members, possesses capacity for yielding in a slight degree under strain, and produces a better distribution of the stresses, by relieving in some measure the shearing strains at the points of the attachment of the end flanges of the integral cross bar to the frame. The length of the slit or opening in the tubular part of the cross bar, however it may be produced, will be proportioned so as to meet the requirements of particular frames.

The integral joining lines in the drawn or welded seamless tube and the joining lines produced by welding the abutting edges of the tube formed from a strip, may be placed wherever desired in the length of the tube, having regard to the purposes of my invention. In some constructions, the slitted line of the tubular cross bar intermediate its ends need not be continuous, but may be broken by reserving unslitted portions at points in the line, and likewise the welding of the abutting edges of the tube formed from a strip according to the preferred method of practicing my invention, may be effected at any desired points in the length of the tube, so that the torsional strains will be absorbed in separated zones in the length of the cross bar. It follows therefore that the stresses to which the cross bar may be subjected, can be completely localized and thrown into such sections in the length of the cross bar as may be desirable to make it fully resistant in the degree required, and yet permit a measure of torsional yielding in the slitted or unwelded portions of the cross bar, within the elastic limits of the metal. The flexibility thus created in the frame responds to its actual requirements and adds greatly to its serviceability under all of the conditions attending its use.

Having thus described my invention, what I claim and desire to secure by Letters Patent of the United States, is:

1. In a vehicle frame, the combination of channel side bars, and a tubular cross bar extended between and connected to the same, the said cross bar being provided with integral end plates entered in the said channels, the line of shearing strain between the cross bar and its end plates having a length equal to the circumference of the cross bar, and the tubular cross bar provided with a longitudinally extending open section intermediate its ends, whereby the stresses incident to the torsional strains upon the frame are absorbed in such open section of the tube.

2. In a vehicle frame, side bars, in combination with a cross bar the ends of which are connected to the side bars, the cross bar being in the form of a tube shaped from a metal blank with its meeting edges welded at the ends and provided with an unwelded intermediate section, whereby the stresses incident to the torsional strains upon the frame are absorbed in the unwelded section of the cross bar.

3. In a vehicle frame, a manufacture comprising a tubular torsion member having integral attaching means at its ends extending transversely thereof, the line of shearing strain at the union of the end and the attaching means having a length equal to the circumference of the tubular member, the said tubular member being formed from a strip of metal with its meeting edges welded in sections of its length and unwelded in other sections, whereby the stresses incident to torsional strains upon the tube are absorbed in the unwelded section.

In testimony whereof, I have signed my name at Milwaukee, this 4th day of May, 1923.

LLOYD RAYMOND SMITH.